(12) United States Patent
Weston, Jr. et al.

(10) Patent No.: US 8,959,177 B1
(45) Date of Patent: Feb. 17, 2015

(54) AUTOMATED SELECTION OF A CONTENT PROVIDER

(71) Applicant: Amazon Technologies, Inc., Reno, NV (US)

(72) Inventors: Kevin Thomas Weston, Jr., Redmond, WA (US); Parag Kumar Garg, Woodinville, WA (US); Charles Guest Tritschler, Los Altos, CA (US); Vincent G. Uttley, Los Altos, CA (US); Samuel Scott Gigliotti, Seattle, WA (US); James Allan Poore, Redmond, WA (US); Andrew Scott Brenner, Sunnyvale, CA (US); Cody Bryce Meyer, Seattle, WA (US); Quais Taraki, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 13/714,076

(22) Filed: Dec. 13, 2012

(51) Int. Cl.
*G06F 15/16* (2006.01)
*H04L 29/06* (2006.01)

(52) U.S. Cl.
CPC .................................. *H04L 65/40* (2013.01)

USPC ........... 709/217; 709/218; 709/229; 709/232; 709/245

(58) Field of Classification Search
CPC ....... H04L 65/40; H04L 67/22; H04L 67/306; H04L 67/101; H04L 67/20; H04L 67/322
USPC .......................... 709/217, 218, 229, 232, 245
See application file for complete search history.

(56) References Cited

U.S. PATENT DOCUMENTS

| 8,495,221 | B1 * | 7/2013 | Tsunoda et al. ............... 709/226 |
| 2010/0185498 | A1 * | 7/2010 | Bechtel ............................ 705/10 |
| 2011/0218865 | A1 * | 9/2011 | Muthukrishnan et al. . 705/14.71 |
| 2013/0013730 | A1 * | 1/2013 | Li et al. ......................... 709/217 |
| 2014/0181212 | A1 * | 6/2014 | Cong ............................. 709/204 |

* cited by examiner

*Primary Examiner* — Liangche A Wang
(74) *Attorney, Agent, or Firm* — Lindauer Law, PLLC

(57) ABSTRACT

Described herein are systems and methods for automatically selecting a content provider for delivery of content for consumption by a user. Various selection data such as cost, historical delivery bitrate, and so forth are gathered and a weighting profile is applied to generate a total weight by content provider. The total weight by content provider may be used to select one content provider from another for delivery of a particular piece of content.

20 Claims, 11 Drawing Sheets

AUTOMATED SELECTION OF A CONTENT PROVIDER

BACKGROUND

A wide variety of media devices are available for consumers to use for the consumption of an even wider selection of content. These media devices may include televisions, tablet computers, personal computers, electronic book ("e-book") readers, gaming consoles, in-vehicle entertainment systems, portable media players, and so forth. The content presented by these media devices may include audio, video, e-books, games, and so forth. The content may be downloaded or streamed from a content provider for consumption on the user's device. The same or similar pieces of content may be available from several different content providers.

Traditionally, the user has had to manually make determinations as to which content provider to receive content from. This manual selection of a content provider may result in many user options and user interfaces, which may be confusing or otherwise result in an adverse user experience.

Figure 1:
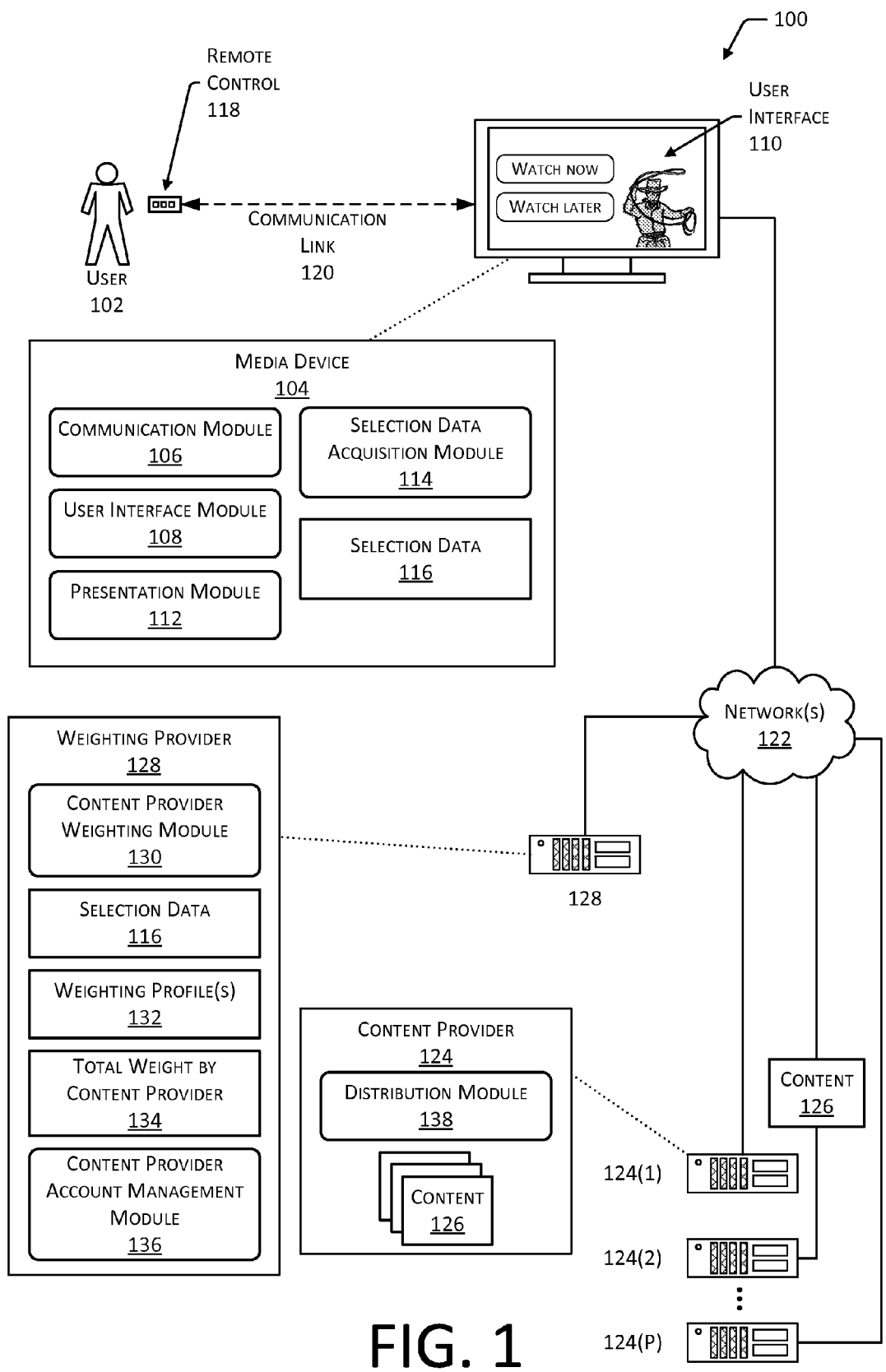
FIG. 1 is an illustrative system for automated selection of a content provider using selection data to which a weighting profile has been applied.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices present content to one or more users, or access the content for later consumption by the one or more users. The same or similar pieces of content may be available from many different content providers. For example, the movie "Burnt Sage" may be available from content providers A, B, and C in different versions or distributions which are the same or similar. For example, the content providers A and B may offer for distribution the high definition version while the content provider C may offer a standard definition version of the same title.

The availability of content may vary over time. For example, the movie "Burnt Sage" may be available as a new release at a premium cost from content provider A, may not yet be available from content provider B, and may be available as part of the subscription from the content provider C.

Traditionally, the user has manually selected a particular content provider for the presentation of content. However, this manual selection may result in an adverse user experience by calling for extensive user interaction. For example, the user may have to balance various factors such as which content providers offer the same or the similar content, review information from each of the content providers such as costs, quality, and so forth. Performance of this task may involve the user maneuvering through various user interfaces to acquire information, select a content provider, and initiate the transfer of the content. For example, the user may find it necessary to search through several content providers to find that a particular piece of content is available for presentation.

Described in this disclosure are methods and systems for automatically selecting a content provider. Once the user has selected a piece of content for consumption, which is available from more than one content provider, automatic selection of the content provider may be used. The automatic selection may be based on selection data which is applied to a weighting profile to generate a total weight by each of the content providers. The total weights for each of the content providers may be compared and used to designate a particular content provider to provide the content.

The selection data may include one or more selection data elements such as user data, content data, technical data, business data, and so forth. The user data may include information which is descriptive of the user and that user's preferences for content delivery, cost to deliver the content to the user, and so forth. The content data may be information specific to the particular content title, such as how popular the content is at a particular content provider. The technical data may include information about delivery of content from the different content providers. The business data may include licensing agreements, provisioning agreements, and so forth. The data may be expressed as numeric values.

The weighting profiles define particular weights to be applied to one or more of the selection data elements. For example, data for the selection data element of server availability may be weighted heavily with a value of 0.95 while the data for the selection data element of provisioning agreements may be weighted less in comparison at 0.20. These weights may be manually generated such as by a system administrator, may be machine generated such as based on user feedback, or may be generated as a combination of both.

By applying one or more of the weighting profiles to the selection data, a total weight for one or more of the content providers may be generated. One of the content providers may then be automatically selected based at least in part on the total weight generated.

The media device may be used to acquire at least a portion of the selection data and generate requests for content. The request for content and at least a portion of this selection data may be provided to a weighting provider. The weighting provider uses the techniques described above to automatically select the content provider. The media device may then receive the content from the designated content provider.

Illustrative System

FIG. 1 is an illustrative system 100 for automated selection of a content provider. A user 102 is depicted with a media device 104 to consume content. While a single user 102 is shown, more than one user 102 may consume content at a given time, such as where multiple users 102 are watching the presented content from a media device 104 together.

The media device 104 may include televisions, tablet computers, personal computers, e-book readers, gaming consoles, in-vehicle entertainment systems, portable media players, and so forth. The media device 104 depicted in FIG. 1 comprises a display.

The media device 104 may connect to other media devices 104 with one or more device interfaces. The device interface may be a High Definition Multimedia Interface ("HDMI") as promulgated by HDMI Licensing LLC, TOSLINK® as promulgated by Toshiba Corp., Ethernet, analog video, analog audio, IEEE 1394 as promulgated by the Institute for Electrical and Electronics Engineers ("IEEE"), Universal Serial Bus ("USB") as promulgated by the USB Implementers Forum, Bluetooth® as promulgated by the Bluetooth Special Interest Group, ZigBee® as promulgated by the ZigBee Alliance, and so forth.

The media device 104 comprises a communication module 106 configured to establish and support communications between the media device 104 and other devices. For example, the communication module 106 may execute instructions which support transmission of data across a data network using the Transmission Control Protocol/Internet Protocol ("TCP/IP").

A user interface module 108 of the media device 104 is configured to provide a user interface 110 to the user 102 and accept inputs responsive to the user interface 110. The user interface 110 may include one or more visual, audible, or haptic elements. For example, the user interface 110 may be configured to provide a graphical user interface ("GUI") using the display, which includes a control to watch the content now using the automatically selected content provider or save the content to watch later. The user interface 110 is described in more detail below with regard to FIG. 2.

The presentation module 112 is configured to present content on, or in conjunction with, the media device 104. The presentation module 112 may be configured to receive streamed content from an external source device such as a server, or the presentation module 112 may access content which has been previously stored on the media device 104. The presentation module 112 may support digital rights management, presentation of encrypted content, and so forth. The presentation module 112 may be configured to work in conjunction with the user interface module 108 to allow the user 102 to select content for consumption. For example, the presentation module 112 may generate information to be presented using the user interface module 108 such as a previously determined list of content available for presentation.

A selection data acquisition module 114 on the media device 104 is configured to acquire selection data 116. The selection data acquisition module 114 may work in conjunction with other modules, such as the communication module 106, the user interface module 108, and the presentation module 112. The selection data 116 may include one or more selection data elements such as user data, content data, technical data, business data, and so forth. The selection data 116 is described in more detail below with regard to FIG. 3.

The media device 104 may be coupled to a remote control 118 using a communication link 120. The remote control 118 may serve as an input device or an input/output device for the media device 104. For example, the remote control 118 may include one or more of a touch sensor, button, accelerometer, gyroscope, camera, microphone, speaker, haptic output device, and so forth. The communication link 120 may be optical, radio frequency, acoustic, and so forth. In one implementation, the communication link 120 may use a personal area network interface, such as one compliant with the Bluetooth® specification. In some implementations, the remote control 118 may comprise another device such as a smartphone, tablet computer, and so forth, which is communicatively coupled to the media device 104.

The media device 104 may couple to one or more networks 122, which are configured to transfer data between devices. The networks 122 may include one or more public networks such as the Internet, private networks, or a combination of both. The network 122 in turn couples to a plurality of content providers 124(1), 124(2), . . . , 124(P), which are provided by different content provider entities. As used in this disclosure, letters in parenthesis such as ("P") indicate an integer value.

While each of the content providers 124 are depicted as single servers, in some implementations, the servers of the content providers or the functions attributed to the servers of the content providers 124 may be provided by a plurality of devices. For example, the server may exist as a virtualized server executing across a plurality of physical servers.

In some implementations, different content providers 124 may be supported by the same hardware. For example, a cloud service provider may use a set of physical server hardware to provide many different virtual servers, which are in turn used by different content provider 124 entities. Unless otherwise indicated, for ease of reference in this disclosure, the terms "content provider" and "content provider entity" may be used interchangeably.

The content provider 124 may provide functions such as streaming content to the media device 104 for presentation, authenticating user accounts, providing content lists, and so forth. The content provider 124 may store, or have access to, one or more pieces of content 126. The content 126 may include audio, video, e-books, games, and so forth. The content 126 may be provided using the network 122 to the media device 104. The presentation module 112 of the media device 104 may receive the content 126 and present it to the user 102.

The presentation module 112 of the media device 104 may be configured to send a request using the network 122 to a weighting provider 128. This request may seek automatic selection of the content provider 124 for a particular piece of content 126. A content provider weighting module 130 of the weighting provider 128 may receive the request and access the selection data 116 and one or more weighting profiles 132.

The weighting profile 132 defines particular weights to be applied to one or more of the selection data elements in the selection data 116. For example, data for the selection data element of server availability may be weighted heavily with a value of 0.95 while the data for the selection data element of provisioning agreements may be lightly weighted at 0.20. These weights may be manually generated such as by a system administrator, may be machine generated such as based on user feedback, or may be a combination of both. The weighting profiles 132 are discussed in more detail below with regard to FIG. 4.

The content provider weighting module 130 may process the selection data 116 with the selected weighting profile 132 to generate a total weight by content provider 134. The total weight by content provider 134 may be used to designate a particular content provider 124 to distribute the content 126 to the media device 104. The total weight by content provider 134 may be determined on demand, or at least a portion of the total weight by content provider 134 may be calculated in advance and retrieved.

In one implementation, the designation by the content provider weighting module 130 may be returned to the media device 104. The presentation module 112 of the media device 104 may then, based at least in part on this designation, select the content provider 124 to provide the content 126.

A content provider account management module 136 may be configured to maintain information about user accounts associated with the user 102, which allow access to the content 126 provided by the different content providers 124. For example, the content provider account management module 136 may include an application programming interface ("API") (not shown), which is configured to connect to a distribution module 138 of the content provider 124 to initiate distribution of the content 126. Using this API, the content provider weighting module 130 may determine the content provider 124 and send a request to initiate streaming of the content 126 to the distribution module 138 of the content provider 124. The distribution module 138 is configured to receive requests for content 126 and distribute the requested piece of content 126 to the media device 104.

In some implementations, at least a portion of the functions of the weighting provider 128 may be incorporated into the media device 104. For example, the media device 104 may be configured to automatically select the content provider 124 as a standalone device.

Figure 2:
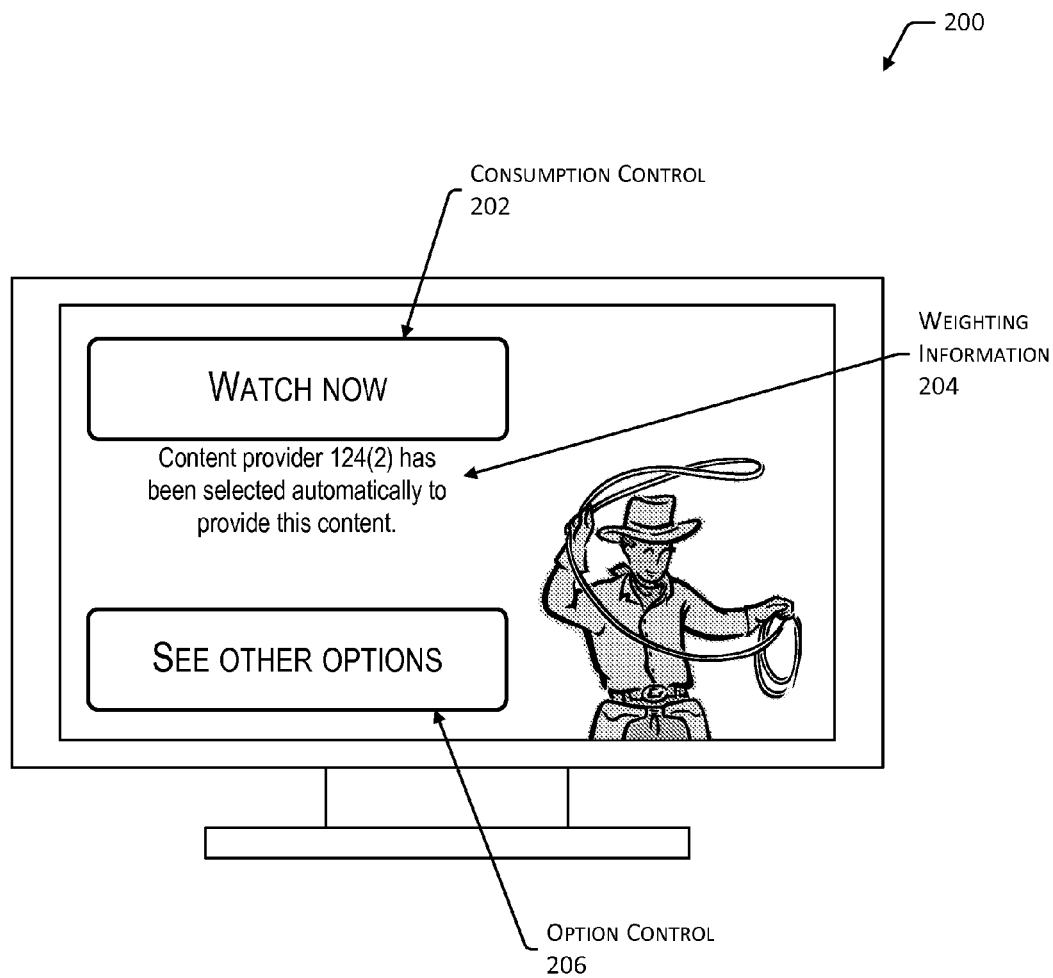
FIG. 2 illustrates a user interface in which a consumption control uses an automatically selected content provider.

FIG. 2 is an illustration 200 depicting the user interface 110 providing a consumption control 202, which uses an automatically selected content provider 124. The user interface 110 may be provided by the user interface module 108. In this illustration, a consumption control 202 is presented by the user interface 110. For example, in the graphical interface depicted here, the consumption control 202 may comprise a button or control which, when activated, will initiate the presentation of the content 126 from the content provider 124 designated by the content provider weighting module 130. The user interface 110 may provide weighting information 204, which is indicative of the content provider 124 that has been automatically selected. In some implementations, where presentation of the content 126 incurs a cost, this cost may be presented.

An option control 206 may be presented as well by the user interface 110. The option control 206 allows the user 102 to access additional actions associated with the content 126 that may be selected. For example, the other actions presented may include storing the content 126 in a watch list or queue for later presentation, seeing a ranked list of the content providers 124 to allow the user 102 to override the automated selection, and so forth.

Using the automated content provider 124 selection techniques described in this disclosure, the consumption controls 202 are significantly simpler and provide a simpler user experience. For example, instead of traditional systems where the user 102 has to navigate different content provider 124 menus and discern a selection from the information presented, an easy choice is presented to the user 102 in the user interface 110.

Figure 3:
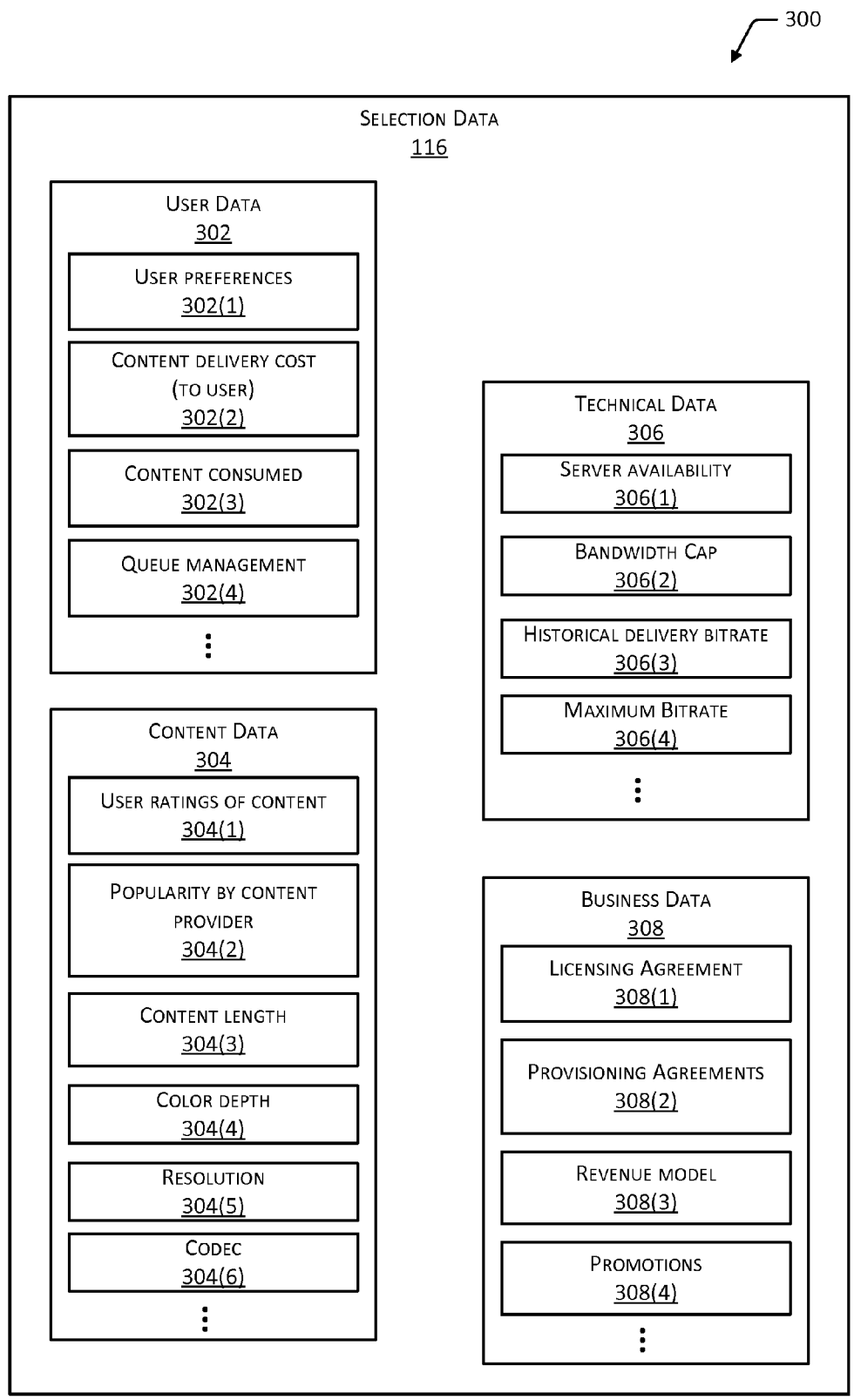
FIG. 3 illustrates a schematic of the selection data, which may be used for the automated selection of the content provider.

FIG. 3 illustrates a schematic 300 of the selection data 116, which may be used by the weighting provider 128 for the automated selection of the content provider 124. The selection data 116 comprises information which is used to provide one or more metrics, upon which a content provider 124 is assessed. In some implementations, the selection data 116 may be expressed as numeric data. As used in this disclosure, selection data elements indicate particular fields, while the data indicates information descriptive of that field. The selection data 116 may be stored as a flat file, database, linked list, tree, or other data structure.

The selection data 116 may include one or more of user data 302, content data 304, technical data 306, or business data 308. In other implementations, other data may be collected as well. The selection data 116, and portions therein, may be provided at different levels of granularity ranging from an individual user 102 or piece of content 126 to all users 102 and all pieces of content 126. For example, the selection data 116 may be specific to the selection data 116 gathered by the selection data acquisition module 114 of a particular media device 104 used by a particular user 102.

The user data 302 may include user preferences 302(1), content delivery cost to the user 302(2), list of content consumed 302(3), queue management activities by the user 302(4) ("queue management"), and so forth. The user preferences 302(1) indicate predefined or machine-learned preferences the user 102 may have for particular resolutions, color depths, content providers 124(1), 124(2), . . . , 124(P), and so forth.

The content delivery cost to the user 302(2) indicates a financial cost incurred by the user 102 to have the content 126 presented by a particular content provider 124. In some implementations, the content delivery cost 302(2) may be determined based on information such as the particular user account information with a given content provider 124, subscription plan, and so forth. For example, the content delivery cost 302(2) may indicate that the content provider 124(1) will charge $2.99 for presentation of the content 126, while the content provider 124(2) is a subscription model to which the user 102 would pay no additional fee to have the content 126 presented.

The list of content consumed 302(3) indicates previous pieces of content 126 which have been consumed by the user 102. The list of content consumed 302(3) may comprise a count of all pieces of content 126 consumed, number of minutes of content 126 consumed, and so forth. Other information such as which content provider 124 was selected may also be stored. For example, a high value may be assigned to indications of the user 102 manually selecting or overriding previous automatic selections or defaults. The content consumed 302(3) data may be specific to a particular content provider 124, or the content consumed 302(3) data may apply across all content providers 124 used by the user 102.

The queue management 302(4) data provides information as to how frequently the user 102 accesses the queue or list of content 126 to be consumed. This queue may comprise information indicative of content 126 selected for previous or future consumption. For example, more frequent access to a watch list associated with a particular content provider 124 may indicate a preference for that particular content provider 124.

The content data 304 provides information indicative of the particular piece of content 126 requested for presentation. The content 126 may include user ratings of content 304(1), a measure of popularity by content provider 304(2), content length 304(3), and so forth.

The user ratings of content 304(1) may also be considered in the automatic selection. The user ratings of content 304(1) include information about user feedback about a particular piece of content 126. This may include a count or other statistical data about the reviews, which may be used to select a particular content provider 124. For example, a first content provider 124(1) which has users 102 rating the same or a similar piece of content 126 may have a higher value than a second content provider 124(2), based on the assumption that the first content provider 124(1) is providing a better overall experience, which leads to higher overall ratings from users 102.

The popularity by content provider 304(2) may provide a count of total number of accesses of the content 126 for a given period of time at a particular content provider 124. In some implementations, the popularity by content provider 304(2) may be indicated as a relative ranking.

The content length 304(3) indicates the total length of the piece of content 126 selected for presentation. The content length 304(3) may affect the total weight, such that longer pieces of content 126 may place higher value on reliability of delivery over extended periods of time.

The content data 304 may include information such as the color depth 304(4) and the resolution 304(5) for the piece of content 126. The color depth 304(4) indicates the number of pixels used to indicate color of a particular pixel. The resolution 304(5) data indicates the number of bits of data used encode the content 126. For example, the resolution 304(5) data may be expressed as the number of pixels in an image or as the number of bits used to encode audio.

The content data 304 may also include information about a codec 304(6) used to encode the content 126. Due to differences in playback quality, digital rights management complexity, licensing costs associated with use of particular codecs 304(6), and so forth, different values may be associated to the content 126 based on the codec 304(6) used to encode the content 126. For example, a codec 304(6) that incurs a per-use cost for presentation may have a low value, while a codec 304(6) that does not incur a per-use cost for presentation may have a high value.

The technical data 306 provides information about the media device 104, the content providers 124, or both the media device 104 and content providers 124. The technical data 306 also reflects information associated with the delivery and provisioning of the content 126. The technical data 306 may include one or more of server availability 306(1), bandwidth caps 306(2) of content providers 124 or network providers, historical delivery bitrate 306(3), maximum bitrate 306(4), and so forth.

The server availability 306(1) provides metrics indicative of historical availability, current availability, or both historical and current availability of a particular content provider 124 to distribute content 126. For example, a high value may indicate that the particular content provider 124 is frequently available.

The bandwidth cap 306(2) may be associated with a content provider 124, network service provider, or a combination of the content provider 124 and network service provider. For example, when the user 102 is approaching a bandwidth cap 306(2), the greater value may be assigned to pieces of content 126 delivered at a lower bitrate to reduce data consumption and avoid meeting or exceeding those caps.

The historical delivery bitrate 306(3) provides information about previous delivery of content 126 from a particular content provider 124. For example, a content provider 124(1) that has delivered the last five pieces of content 126 at a very low bitrate may have a value lower than a content provider 124(2) that has delivered the last five pieces of content 126 at a high bitrate. The bitrate may represent the encoding of audio, video, or both audio and video.

The technical data 306 may also include information such as the maximum bitrate 306(4), which provides data about the peak sustainable bitrate from the content provider 124. The maximum bitrate 306(4) may be constrained by the content provider 124 hardware, software, or by the network 122.

The business data 308 comprises information about other aspects associated with the content 126 or service provisioning, which may be used to select the content provider 124 automatically. Licensing agreement 308(1) information may be encoded. For example, a particular licensing agreement 308(1) may be associated with a particular piece of content 126 that requires the content 126 to be available in a particular resolution on a particular time scheduled to users 102 in particular geographic areas. Provisioning agreements 308(2) that define particular caps or rotation of which content provider 124 is used may also be provided as part of the business data 308. For example, the provisioning agreement 308(2) may call for distributing any requests for content 126 over a predetermined threshold to a particular content provider 124, to avoid saturation of a particular content provider 124.

The business data 308 may include information about revenue models 308(3) and promotions 308(4). The revenue modules 308(3) may be used to encode values representative of the financial benefits for selecting a particular content provider 124. For example, a high value may be assigned to content providers 124 that provide greater remuneration. Likewise, promotions 308(4) for the use of a particular content provider 124 may be applied to encourage traffic at a particular content provider 124. For example, a particular content provider 124 may offer a content promotion for users 102 to "buy three, get one free."

Figure 4:
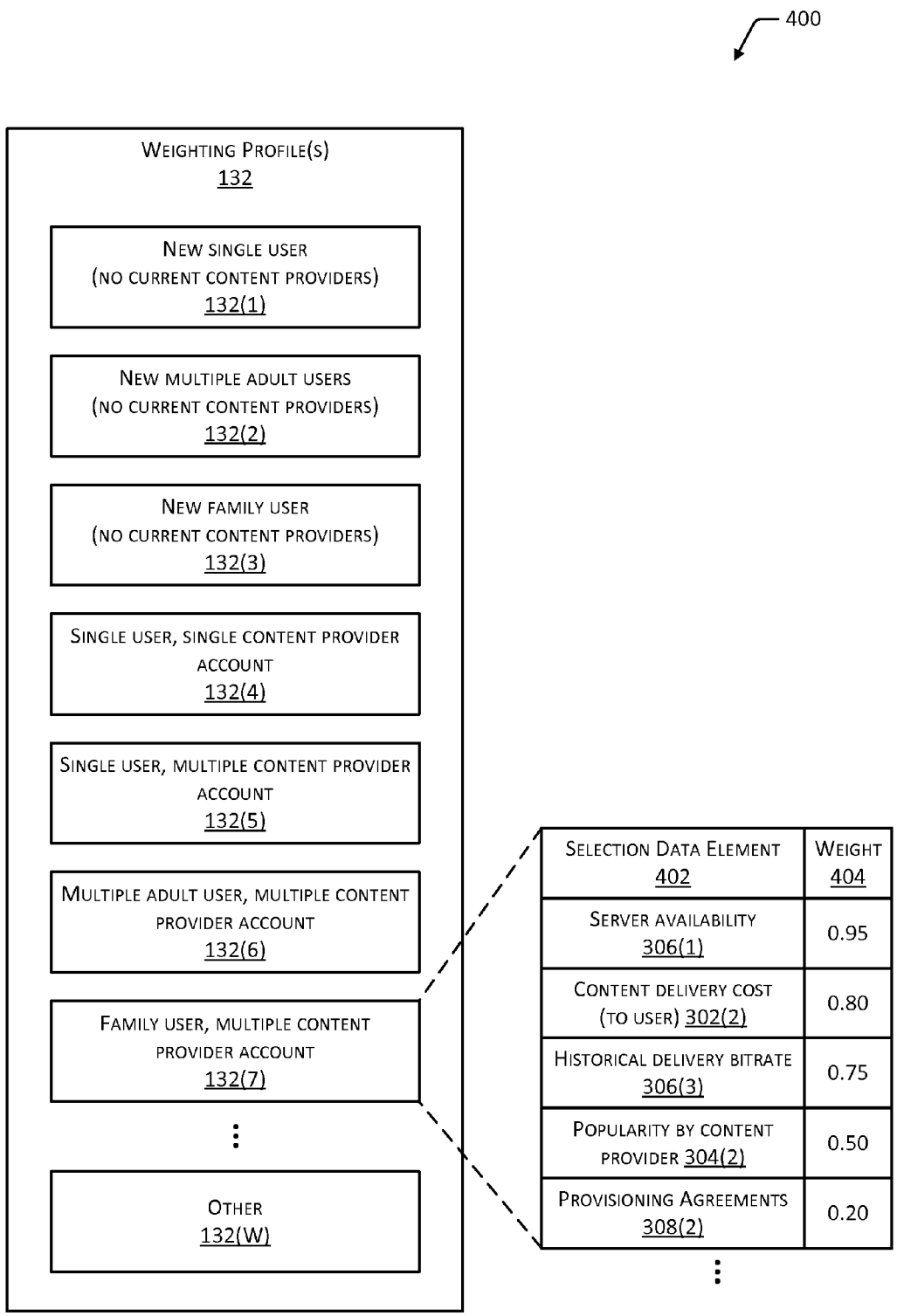
FIG. 4 illustrates a schematic of the weighting profiles, which may be used for the automated selection of the content provider.

FIG. 4 illustrates a schematic 400 of the weighting profiles 132, which may be used for automated selection by the content provider 124. The weighting profiles 132 may be stored as a flat file, database, linked list, tree, or other data structure.

The weighting profile 132 defines particular weights to be applied to the values of one or more of the selection data elements in the selection data 116. In this illustration, several weighting profiles 132 are shown. The weighting profiles 132 may be associated with different categories of use or user 102. As shown here, weighting profiles 132 may be configured for a new single user 102 with no current content provider relationships 132(1), new multiple adult users with no current content providers 132(2), or new family user with no current content providers 132(3).

The weighting profiles 132 may also include single users 102 with a single content provider account 132(4), single user 102 with multiple content provider accounts 132(5), multiple adult users 102 with multiple content provider accounts 132(6), or a family user 102 with multiple content provider accounts 132(7). Other weighting profiles 132(W) may also be available.

A particular weighting profile 132 may be associated with a particular user 102. For example, during configuration of the media device 104, the user 102 may enter various demographic information and account information associated with the different content providers 124 that the user 102 has previous relationships with. Based on the user 102 indicating that the user 102 is part of a family and has accounts with the content providers 124(1) and 124(2), the weighting profile 132(7) may be selected for use.

Details of the weighting profile 132(7) are shown including selection data elements 402 and associated weights 404 for each of the selection data elements 402. The combination of selection data elements 402 chosen may vary between weighting profiles 132. For example, in this illustration, the weighting profile 132(7) includes the popularity by content provider 304(2) data element, but another weighting profile such as 132(4) may omit this selection data element 402.

The weights 404 are expressed here as a numeric value by way of illustration and not as a limitation. Where numeric, the weight 404 may be positive or negative. For example, in some implementations, a particular selection data element 402 may be associated with a negative user experience, and so that particular selection data element 402 may be assigned a negative weight 404 that may be subtracted from that the total weight by content provider 134 for that content provider 124.

Continuing the example, in this illustration, the weighting profile 132(7) includes several of the selection data elements

402 and corresponding weights 404. For example, the server availability 306(1) has a weight 404 of 0.95, the content delivery cost to the user 302(2) has a weight 404 of 0.80, the historical delivery bitrate 306(3) has a weight 404 of 0.75, the popularity by content provider 304(2) has a weight 404 of 0.50, and the provisioning agreements 308(2) are assigned a weight 404 of 0.20.

The weights 404 may be manually generated such as by a system administrator, may be machine generated such as based on user feedback, or may be generated as a combination of both. For example, an administrator may manually configure initial weight 404, whereupon a machine-learning system may adjust those weights 404 over time based at least in part on user feedback and behavior.

Figure 5:
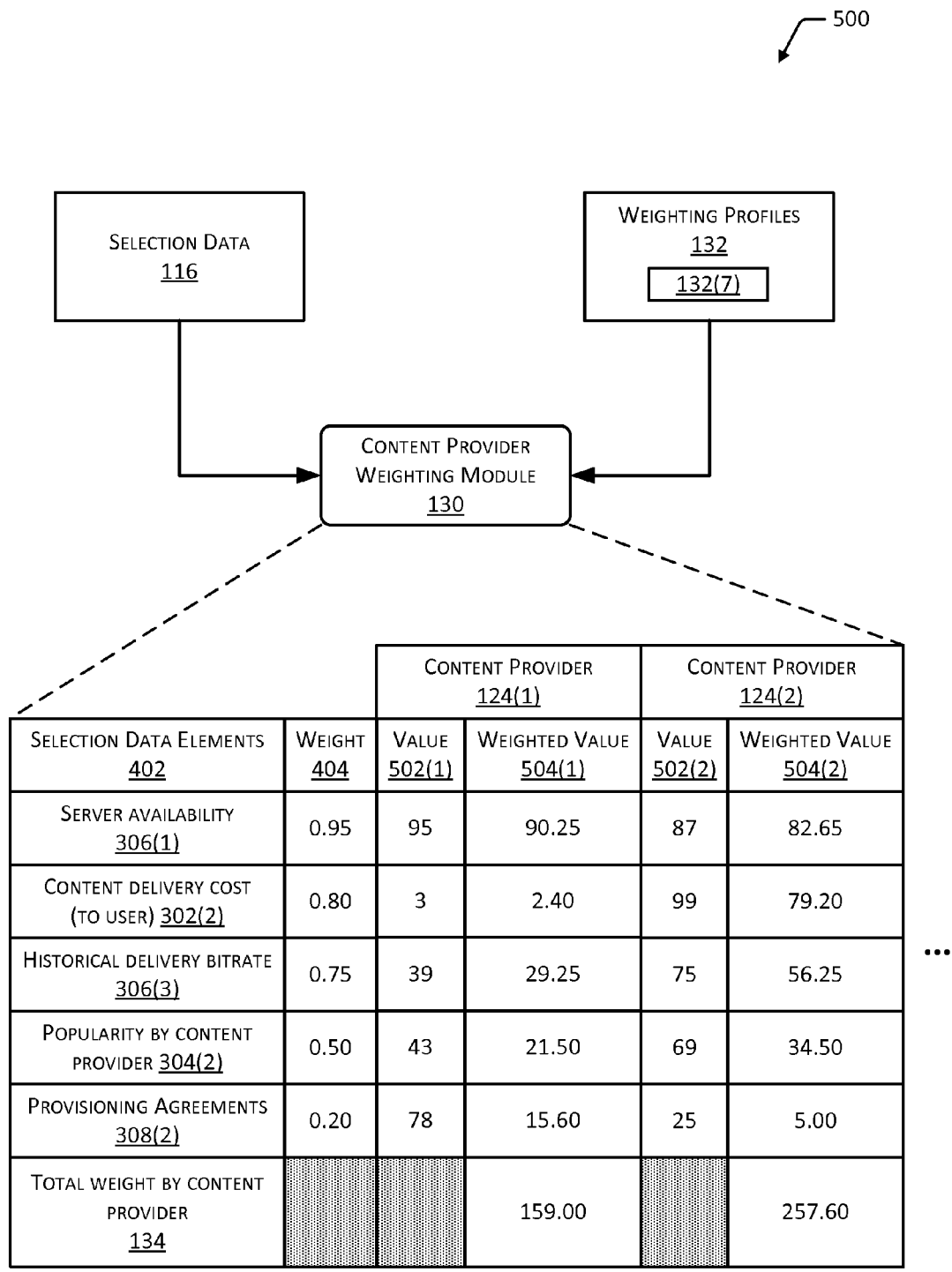
FIG. 5 illustrates the application of the weighting profile to the selection data to generate total weight by content provider.

FIG. 5 illustrates the application 500 of the weighting profile 132 to the selection data 116 to generate total weight by content provider 134. In some implementations, this may be implemented by the content provider weighting module 130.

As illustrated here, the content provider weighting module 130 retrieves the selection data 116 and the weighting profile 132 associated with a particular user 102, media device 104, or both the user 102 and the media device 104. For example, the user 102(1) may be associated with the selection data 116(1) and the weighting profile 132(7).

The selection data elements 402 and weights 404 for each associated with the particular weighting profile 132 for are accessed, and the associated values 502 are retrieved from the selection data 116. As described above, these values 502 may be specific to a particular content provider 124. As illustrated here, the server availability 306(1) value 502(1) for the content provider 124(1) is "95", while the server availability 306(1) value 502(2) for the content provider 124(2) is "87".

The values 502 are multiplied by the weight 404 for that selection data element 402. Continuing the example, the sever availability 306(1) has a weight 404 of "0.95". Multiplying the weights 404 with the respective values 502 generates a weighted value 504. In this example, based on the weights 404 and the values 502, a weighted value 504(1) of "90.25" for the content provider 124(1) is calculated and a weighted value 504(2) of "82.65" for the content provider 124(2) is calculated.

The weighted values 504 for the different selection data elements 402 may be summed for each content provider 124 to generate the total weight by content provider 134. Continuing the example, in this illustration, the content provider 124(1) has a total weight 134(1) of "159.00" while the content provider 124(2) has a total weight 134(2) of "257.60."

The content provider weighting module 130 may use the total weight for content provider 134 to select the content provider 124 to distribute the content 126. In this example, the content provider weighting module 130 may be configured to select the content provider 124(1) with the greatest total weight by content provider 134. Based on this configuration, the content provider 124(2) may be selected as the total weight by content provider 134(2) of "257.60" is greater than the total weight by content provider 134(1) of "159.00".

In some implementations, at least a portion of the total weight by content provider 134 may be pre-calculated. For example, some of the selection data elements 402 such as server availability 306(1) and the historical delivery bitrate 306(3) may be considered constant across different pieces of content 126 from the same content provider 124. As a result, these selection data elements 402 may be pre-calculated and then combined with content-specific selection data elements 402 at the time of processing. In some other implementations, the entire total weight may be pre-calculated in advance for frequently-accessed combinations of content 126, weighting profiles 132, and so forth. The pre-calculated portions may be then retrieved upon request.

Figure 6:
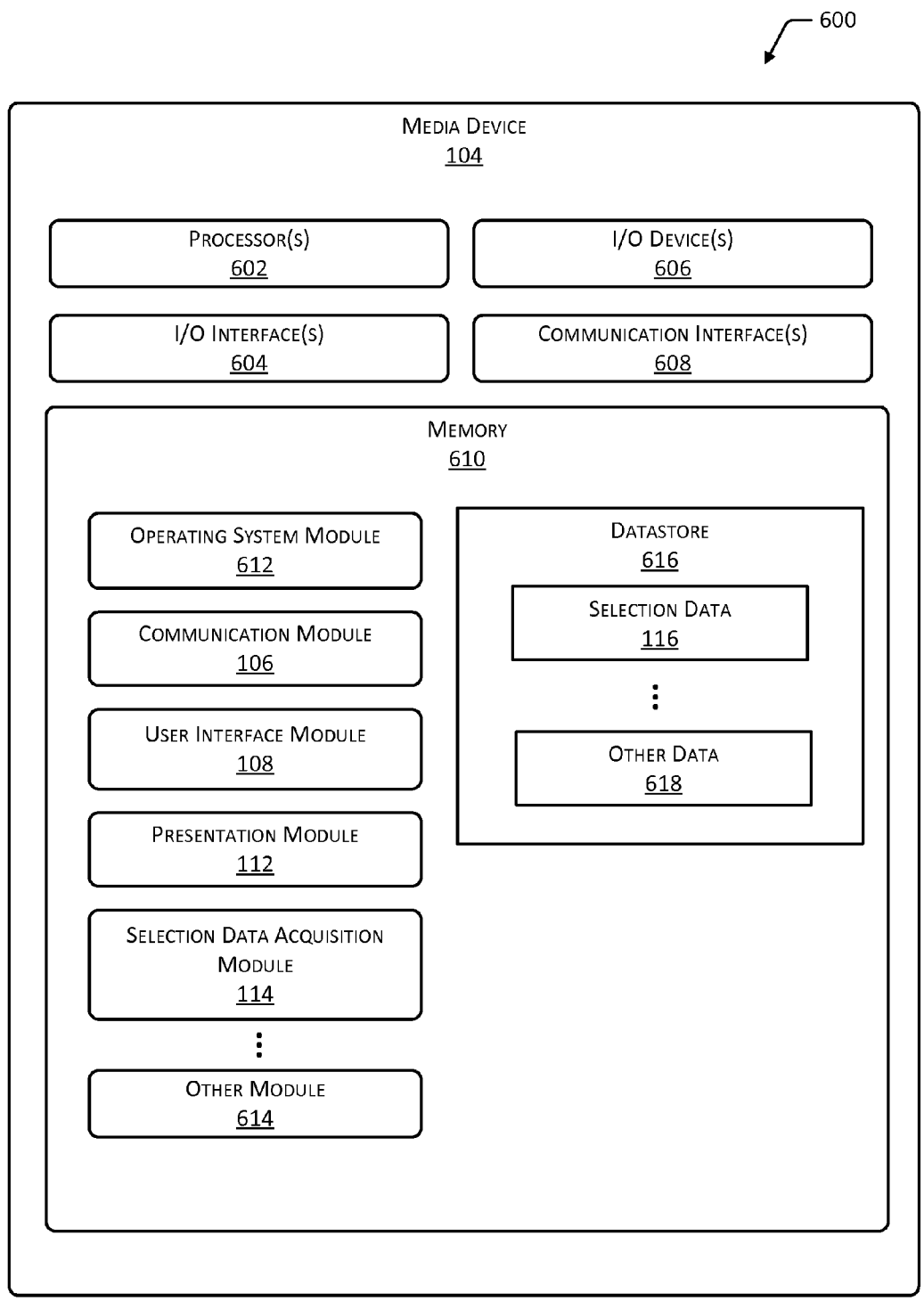
FIG. 6 illustrates a block diagram of a media device configured to use automated selection of the content provider.

FIG. 6 illustrates a block diagram 600 of the media device 104 configured to use automated selection of the content provider 124 from a plurality of content providers 124. The media device 104 may include one or more processors 602 configured to execute one or more stored instructions. The processors 602 may comprise one or more cores. The media device 104 may include one or more input/output ("I/O") interface(s) 604 to allow the processor 602 or other portions of the media device 104 to communicate with other devices. The I/O interfaces 604 may comprise Inter Integrated Circuit ("I2C"), Serial Peripheral Interface bus ("SPI"), USB, RS-232, a media device interface such as HDMI, and so forth.

The I/O interface(s) 604 may couple to one or more I/O devices 606. The I/O devices 606 may include input devices such as one or more of a camera, a microphone, a touch sensor, a button, and so forth. The I/O devices 606 may also include output devices such as one or more of a display, audio speakers, haptic output device, and so forth. In some embodiments, the I/O devices 606 may be physically incorporated with the media device 104 or may be externally placed.

The media device 104 may also include one or more communication interfaces 608. The communication interfaces 608 are configured to provide communications between the media device 104 and other devices. The communication interfaces 608 may include personal area networks ("PANS"), wireless local area networks ("LANS"), wireless wide area networks ("WAN"), and so forth. The media device 104 may communicate with the remote control 118 using one or more of the communication interfaces 608. For example, the media device 104 may communicate with the remote control 118 using a Bluetooth® PAN.

As described above, one or more of the device interfaces are also present in the media device 104. The device interfaces allow for the exchange of information between the media device 104 and other media devices 104. The device interface may include one or more of a HDMI, TOSLINK®, Ethernet, analog video, analog audio, IEEE 1394, USB, Bluetooth®, ZigBee®, and so forth. The device interfaces may allow for wired or wireless communication between the media device 104 and the other media devices 104.

The media device 104 may also include one or more busses or other internal communications hardware or software that allow for the transfer of data between the various modules and components of the media device 104.

As shown in FIG. 6, the media device 104 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the media device 104.

The memory 610 may include at least one operating system ("OS") module 612. The OS module 612 is configured to manage hardware resource devices such as the I/O interfaces 604, the I/O devices 606, the communication interfaces 608, the device interfaces, and provide various services to applications or modules executing on the processors 602. Also stored in the memory 610 may be the communication module 106, the user interface module 108, the presentation module 112, and the selection data acquisition module 114.

As described above, the communication module 106 is configured to establish and support communications between the media device 104 and other devices. The communication module 106 may access the communication interfaces 608 to exchange information. For example, the communication module 106 may be configured to send a request from the media device 104 for determination of a content provider 124 for presentation of content 126 to the weighting provider 128 using the network 122.

The communication module 106 may also be configured to acquire at least a portion of the selection data 116 and provide this information to the selection data acquisition module 114. For example, the communication module 106 may monitor the maximum bitrate provided by the content provider 124 while sending content 126 to the media device 104.

The user interface module 108 is configured to provide the user interface 110 to the user 102 using the I/O devices 606 and accept inputs received from the I/O devices 606. The user interface 110 may include one or more visual, audible, or haptic elements. For example, the user interface 110 may be configured to provide an audible user interface 110 using the speakers, which includes a prompt to listen now to an audiobook using the automatically selected content provider 124 or to save the content 126 to listen later.

The presentation module 112 is configured to present content 126 on, or in conjunction with, the media device 104. The presentation module 112 may be configured to receive streamed content 126 from an external source device such as the server of the content provider 124, or the presentation module 112 may access content 126 that has been previously stored on the media device 104 in the memory 610. The presentation module 112 may support digital rights management, presentation of encrypted content 126, and so forth.

The presentation module 112 may be configured to work in conjunction with the user interface module 108 to allow the user 102 to select content 126 for consumption. For example, the presentation module 112 may generate information to be presented using the user interface module 108 such as a previously determined list of content 126 available for presentation. Once selected, the presentation module 112 may use the communication module 106 to send a request to the weighting provider 128. The weighting provider 128 may process the request and automatically determine the content provider 124. This determination may then be returned to the presentation module 112 on the media device 104. Based at least in part on the determination, the presentation module 112 may initiate presentation using the automatically determined content provider 124.

The selection data acquisition module 114 on the media device 104 is configured to acquire at least a portion of the selection data 116 used by the content provider weighting module 130. The selection data acquisition module 114 may work in conjunction with other modules, such as the communication module 106, the user interface module 108, and the presentation module 112. In some implementations, the selection data acquisition module 114 may access system or user logs and use the information therein to generate at least a portion of the selection data 116.

The selection data acquisition module 114 may be configured to use the user interface module 108 to provide a user interface 110 to the user 102 that allows for the specification of preferences, indication of whether to allow or disallow collection of the selection data 116, and so forth. For example, the user 102 may choose to opt-in to collection and sharing of the selection data 116 with the weighting provider 128.

Other modules 614 may be stored in the memory 610. For example, a digital rights management module may work in conjunction with the presentation module 112 to facilitate access to content 126.

The memory 610 may also include a datastore 616 to store information. The datastore 616 may use a flat file, database, linked list, tree, or other data structure to store the information. In some implementations, the datastore 616 or a portion of the datastore 616 may be distributed across one or more other devices including servers, network attached storage devices, and so forth.

The datastore 616 may store a portion of the selection data 116 or other data 618. For example, the other data 618 may include user preferences, local copies of content 126, and so forth.

Figure 7:
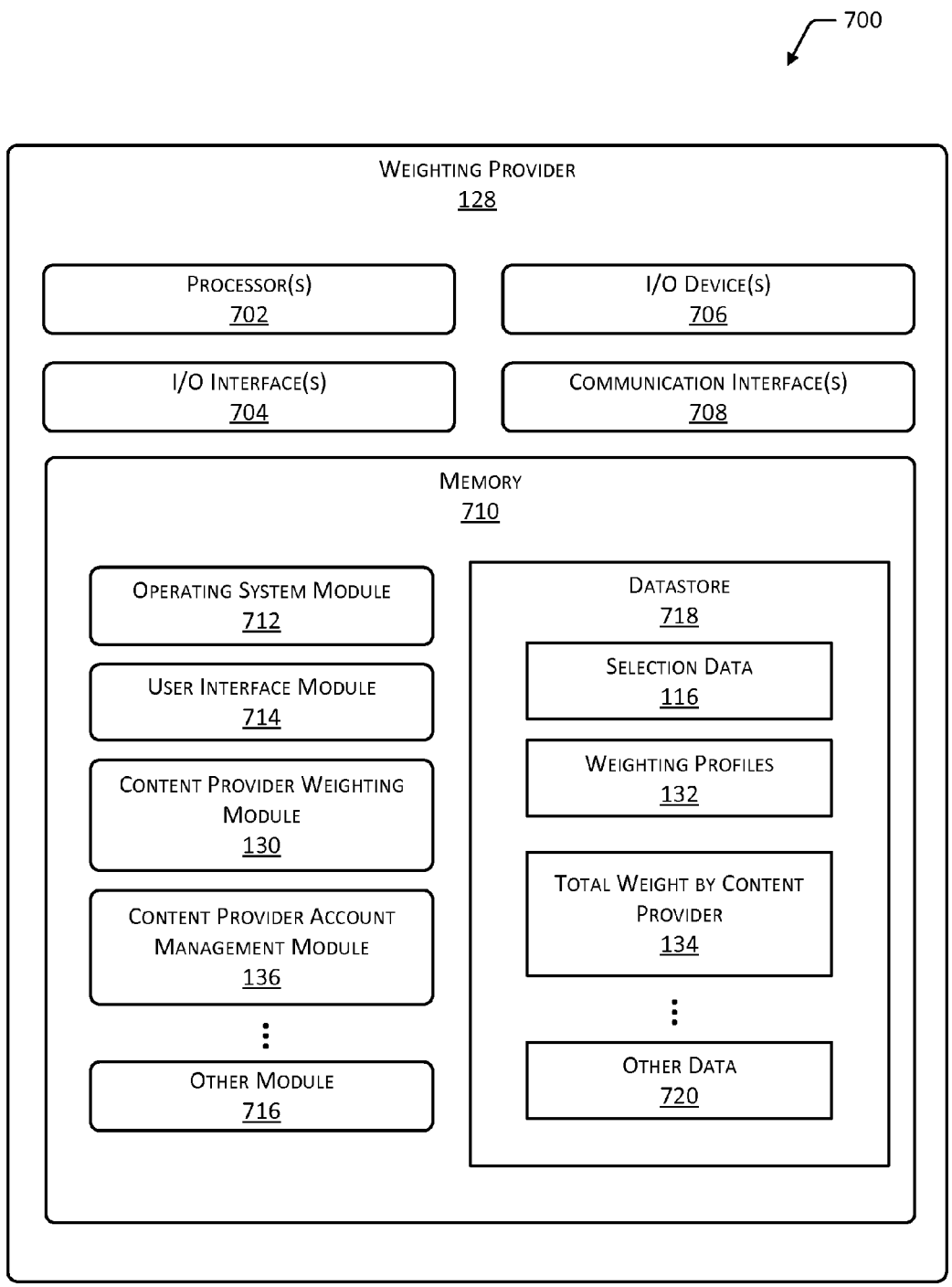
FIG. 7 illustrates a block diagram of a weighting provider configured determine the total weight by content provider.

FIG. 7 illustrates a block diagram 700 of a server of the weighting provider 128, which is configured to determine the total weight by content provider 134. The weighting provider 128 may be implemented as one or more servers. The one or more servers may be physical server devices or virtual servers executing on physical server devices.

The weighting provider 128 may include one or more processors 702 configured to execute one or more stored instructions. The processors 702 may comprise one or more cores. The weighting provider 128 may include one or more I/O interface(s) 704 to allow the processor 702 or other portions of the weighting provider 128 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, a touch sensor, and so forth. The I/O devices 706 may also include output devices such as one or more of a display, printer, and so forth. In some embodiments, the I/O devices 706 may be physically incorporated with the weighting provider 128 or may be externally placed.

The weighting provider 128 may also include one or more communication interfaces 708. The communication interfaces 708 are configured to provide communications between the weighting provider 128 and other devices such as the media device 104. The communication interfaces 708 may include wireless LAN, wireless WAN, and so forth. For example, the communication interfaces 708 may include an Ethernet interface which connects to the network 122.

The weighting provider 128 may also include one or more busses or other internal communications hardware or software that allow for the transfer of data between the various modules and components of the weighting provider 128.

As shown in FIG. 7, the weighting provider 128 includes one or more memories 710. The memory 710 comprises one or more CRSM, as discussed previously in FIG. 6. The memory 710 provides storage of computer readable instructions, data structures, program modules, and other data for the operation of the weighting provider 128.

The memory 710 may include at least one OS module 712. The OS module 712 is configured to manage hardware resource devices such as the I/O interfaces 704, the I/O devices 706, the communication interfaces 708, the device interfaces, and provide various services to applications or modules executing on the processors 702. Also stored in the memory 710 may be a user interface module 714, the content provider weighting module 130, and the content provider account management module 136.

The user interface module 714 is configured to provide a user interface 110 to the user 102 or to the media device 104. In one implementation, the user interface 110 may be a web interface presented via the network 122 and accessible to the users 102. In another implementation, the user interface 110 may comprise an API, which enables communication such as sending requests for content provider 124 selection from the media device 104 to the weighting provider 128.

The user interface module 714 may also be configured to accept feedback or information from the users 102, including, but not limited to, the selection data 116. In one implementation, the user interface module 714 may be configured to provide an interface to the media device 104 to allow for the exchange of the selection data 116.

The content provider weighting module 130 may process the selection data 116 with the selected weighting profile 132 to generate the total weight by content provider 134. The selection data 116 may be based at least in part on information from the media device 104, the weighting provider 128, the content provider 124, or another source. For example, the weighting provider 128 may access a datastore containing information about content ratings, content length, and so forth. The total weight by content provider 134 may be determined on demand, or at least a portion of the total weight by content provider 124 may be pre-calculated and retrieved.

The content provider weighting module 130 may be configured to operate based at least in part on a request received from the media device 104. For example, the media device 104 may send information to the weighting provider 128 indicative of the user's 102 request to have a particular piece of content 126 presented. The content provider weighting module 130 may provide either the total weight by content provider 134 for the available content providers 126, or the content provider weighting module 130 may provide data indicating the automatically selected content provider 124. The process of generating the total weight by content provider 134 is discussed in more detail below with regard to FIG. 9.

The content provider account management module 136 may be configured to maintain information about user accounts associated with the user 102. These user accounts may be associated with content access privileges to content 126. The content provider weighting module 130 may use the content provider account management module 136 to provide information about current content 126 access parameters, costs, and so forth, which may be used to determine one or more pieces of selection data 116.

In some implementations, the content provider account management module 136 may include an API configured to connect to the distribution module 138 of the content provider 124 to initiate distribution of the content 126. For example, the content provider weighting module 130 may determine the content provider 124 for presentation and send a request to initiate streaming of the content 126 to the distribution module 138 of the content provider 124 for delivery to the media device 104. In other implementations, other data transfers may be initiated, such as sending at least a portion of the content 126 to an edge node of a content delivery network. The edge node is a server proximate to the media device 104 through the network 122. The proximity may be based on geography, network performance characteristics such as latency or bandwidth, and so forth. For example, the edge node may be a server located in the same town as the media device 104.

Other modules 716 may be stored in the memory 710. For example, a weighting profile learning module may be configured to dynamically adjust at least a portion of the weighting profiles 132 based on the selection data 116 or other input.

The memory 710 may also include a datastore 718 to store information. The datastore 718 may use a flat file, database, linked list, tree, or other data structure to store the information. In some implementations, the datastore 718 or a portion of the datastore 718 may be distributed across one or more other devices including servers, network attached storage devices, and so forth.

The datastore 718 may store a portion of the selection data 116 as indicated above, the weighting profiles 132, generated total weight by content provider 134, or other data 720. For example, the other data 720 may include administrator preferences, account information associated with the user 102, and so forth.

In one implementation, one or more of the functions of the weighting provider 128 may be provided on the media device 104. For example, in some implementations, the media device 104 may include a content provider weighting module 130, weighting profiles 132, and so forth. In this implementation, the weighting provider 128 as a separate device may be omitted from the system, and the media devices 104 may operate independently to automatically select a content provider 124.

Illustrative Processes

Figure 8:
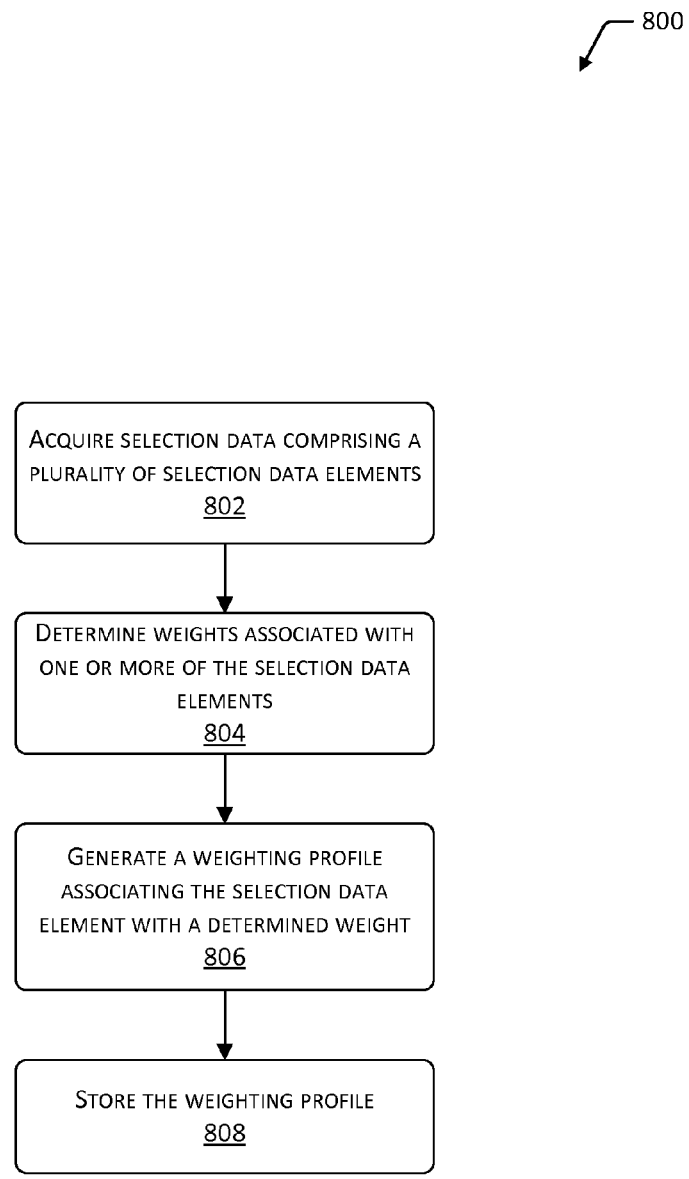
FIG. 8 is a flow diagram of a process of generating a weighting profile.

FIG. 8 is a flow diagram 800 of a process of generating the weighting profile 132. In some implementations, this process may be provided by the weighting provider 128.

Block 802 acquires the selection data 116 comprising a plurality of selection data elements 402. The selection data 116 may be acquired from the media device 104, the content provider 124, or other sources. For example, the content provider 124 may provide content data 304 to the weighting provider 128.

Block 804 determines weights associated with one or more of the selection data elements 402. In some implementations, the weights may be determined by processing the selection data 116 using one or more machine learning techniques. For example, historical selection data 116 may be processed to determine correlation between different factors and selection of a content provider 126. The correlation may then be used to generate weights 404, such that selection data elements 402 which are highly correlated to selection of the content provider 124 may be weighted more heavily.

In some implementations, the weights 404 may be determined by receiving input from one or more users 102. These may be administrative users, end users, or a combination of both administrative users and end users. In one implementation, this input may be gathered by presenting one or more options to one or more users 102. The presented options may be associated with content 126 delivery. Input may be received from the one or more users 102 responsive to the one or more options. For example, the user 102 may be presented with a series of questions used to rank which parameters are most important to that user 102, such as delays in presentation, resolution presented, and so forth. The responses to these questions may then be used to set the weight 404 for one or more of the selection data elements 402.

Block 806 generates the weighting profile 132 associating the selection data element 402 with a determined weight 404. For example, the selection data element 402 for server availability 306(1) has a weight 404 of "0.95".

Block 808 stores the weighting profile 132. For example, the weighting profile 132 may be stored in the memory 710. As described above, the weighting profile 132 may then be accessed by the content provider weighting module 130 to generate the total weight by content provider 134.

Figure 9:
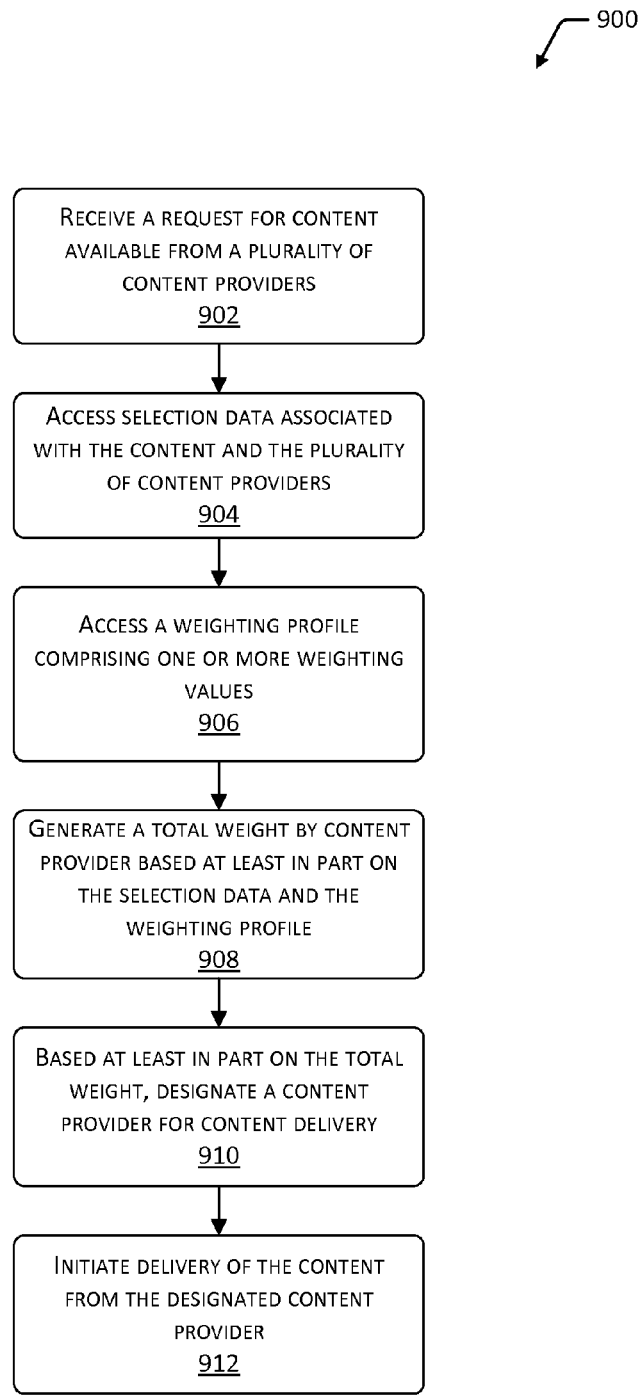
FIG. 9 is a flow diagram of a process of automatically selecting a content provider to provide content.

FIG. 9 is a flow diagram 900 of a process for automatically selecting a content provider 124 to provide the content 126. This process may be implemented by one or more of the media device 104, the weighting provider 128, or the content provider 124.

Block 902 receives from the user interface 110 a request for content available from a plurality of content providers 124(1), 124(2), ..., 124(P). For example, the user 102 may select from a list a piece of content 126 to watch. The selection of a particular content 126 may in turn result in generation of the request for that particular content 126.

Block 904 accesses the selection data 116 associated with the video content 126 and the plurality of the content providers 124(1), 124(2), ..., 124(P). As described above, the selection data 116 may be indicative of one or more aspects of content delivery of the video content 126 from one or more of the plurality of content providers 124(P).

Block 906 accesses a weighting profile 132 associated with the request for the particular content 126. In one implementation, this may be a weighting profile 132 associated with the user 102. As described above, the weighting profile 132 may comprise one or more selection data elements 402 and associated weights 404 for each of the selection data elements 402. The selection data elements 402 are the one or more aspects or attributes of selection data 116.

As also described above, selection data elements 402 may comprise one or more of the content delivery costs 302(2) of the video content 126 associated with the user 102 from each of the plurality of content providers 124, the popularity by content provider 304(2) comprising a count of total number of accesses of the video content 126 for a given period of time at each of the plurality of the content providers 124, or the historical delivery bitrate 306(3) of the content 126 from each of the plurality of content providers 124.

Block 908 generates a total weight by content provider 134 for each of the plurality of content providers 124 based at least in part on the weighting profile 132 and the selection data 116. The total weight by content provider 134 may be determined based, at least in part, by evaluating the selection data 116 associated using the one or more of the plurality of content providers 124 using the weighting values 404 associated with the selection data 116. For example, the values 502 of the selection data 116 for the content provider 124 in each of the selection data elements 402 may be multiplied by the weights 404 in the weighting profile 132 to generate weighted values 504 for each of the plurality of the content providers 124. The products for each of the plurality of the content providers 124 may then be summed to form the total weight by content provider 134 for each of the content providers 124. In other implementations, other operations may be performed to generate the total weights by content provider 134.

Based at least in part on the total weight by the content providers 134, block 910 designates a content provider 124 for delivering the requested video content 126. For example, based on having the greatest total weight by the content provider 134 of "257.60", the content provider 124(2) may be selected.

Once designated, block 912 may initiate delivery of the video content 126 from the designated content provider 124. In one implementation, the media device 104 may request the content 126. In another implementation, the weighting provider 128 may send to the designated content provider 124 a request to deliver the content 126 to the media device 104. As mentioned above, in other implementations, other data transfers may be initiated, such as sending at least a portion of the content 126 to an edge node of a content delivery network.

Figure 10:
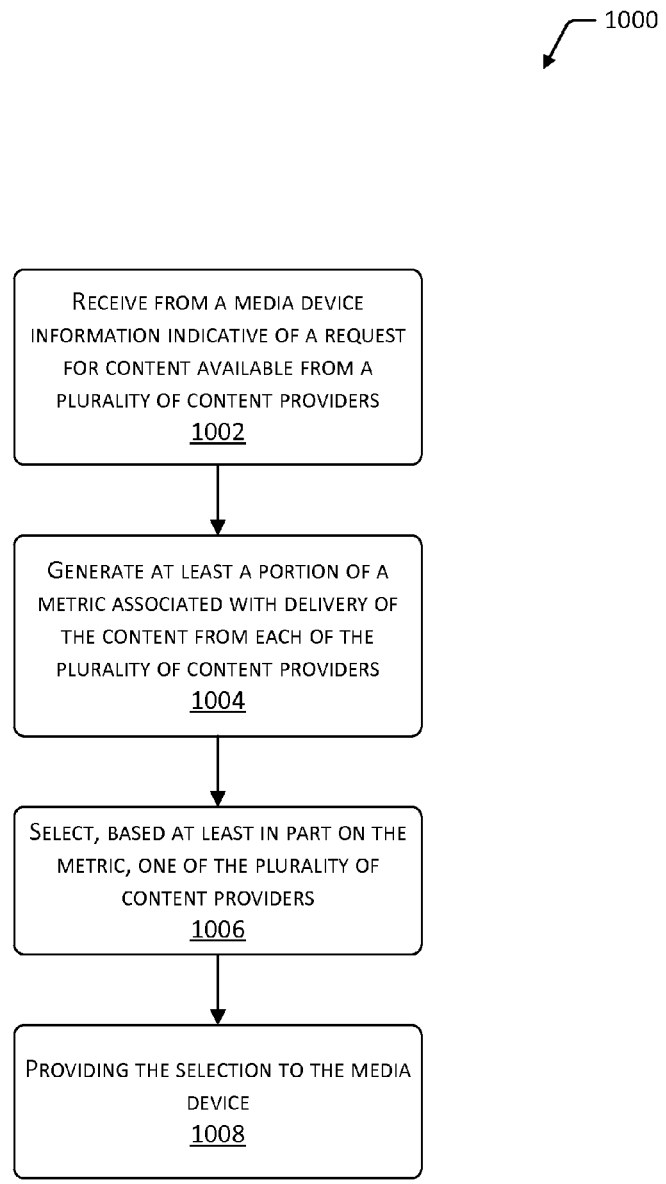
FIG. 10 is a flow diagram of another process of automatically selecting a content provider to provide content.

FIG. 10 is a flow diagram 1000 of another process of automatically selecting a content provider 124 to provide content 126. This process may be implemented by one or more of the media device 104, the weighting provider 128, or the content provider 124.

Block 1002 receives, from a media device 104 or other device, information indicative of a request for delivery of content 126. The same or similar content 126 may be available from a plurality of content providers 124. For example, similar content 126 may include content 126 with the same title but which is encoded in a different resolution. As described above, the content 126 may comprise one or more of audio, video, electronic books, or an executable application.

In some implementations, an additional block may determine availability of the content 126 for delivery from a plurality of content providers 124. This determination may be made by sending a request for availability information to the plurality of content providers 124.

Block 1004 generates at least a portion of a metric associated with delivery of the content 126 from each of the plurality of content providers 124. The metric may be based at least in part on data indicative of one or more aspects of content delivery of the content 126 from one or more of the plurality of content providers 124. For example, the metric may comprise the total weight by content provider 134 and the data may comprise the selection data 116 as described above. The data indicative of one or more aspects of content delivery of the content 126 may include account information associated with a user account for each of the content providers 124.

The metric may be generated by accessing the data indicative of one or more aspects of content delivery of the content 126 from the plurality of the content providers 124 and associated with a plurality of selection data elements 402. A weighting profile 132 may be accessed, which comprises one or more of the selection data elements 402 and associated weights 404 for each of the selection data elements 402. The weighting profile 132 may be applied to the data to generate the metric. The metric may comprise the total weight by content provider 134 for each of the plurality of content providers 124.

In some implementations, a portion of the metric may be pre-calculated before receiving the information indicative of the request. For example, a first portion of the metric may be calculated before receiving the information indicative of the request. Continuing the example, a second portion of the metric may be calculated using data indicative of one or more of the selection data elements 402 which are specific to the particular content 126 indicated in the request. The generation of the metric may then include combining the pre-calculated first portion and the second portion which is specific to the particular content 126 indicated in the request.

Block 1006 selects, based at least in part on the metric, one of the plurality of content providers 124. For example, the metric may indicate that the content provider 124(3) is the appropriate content provider 124 to deliver the content 126 at this time.

Block 1008 provides the selection to the media device 104 or other device. For example, the weighting provider 128 may send the information using the network 122 to the media device 104.

Figure 11:
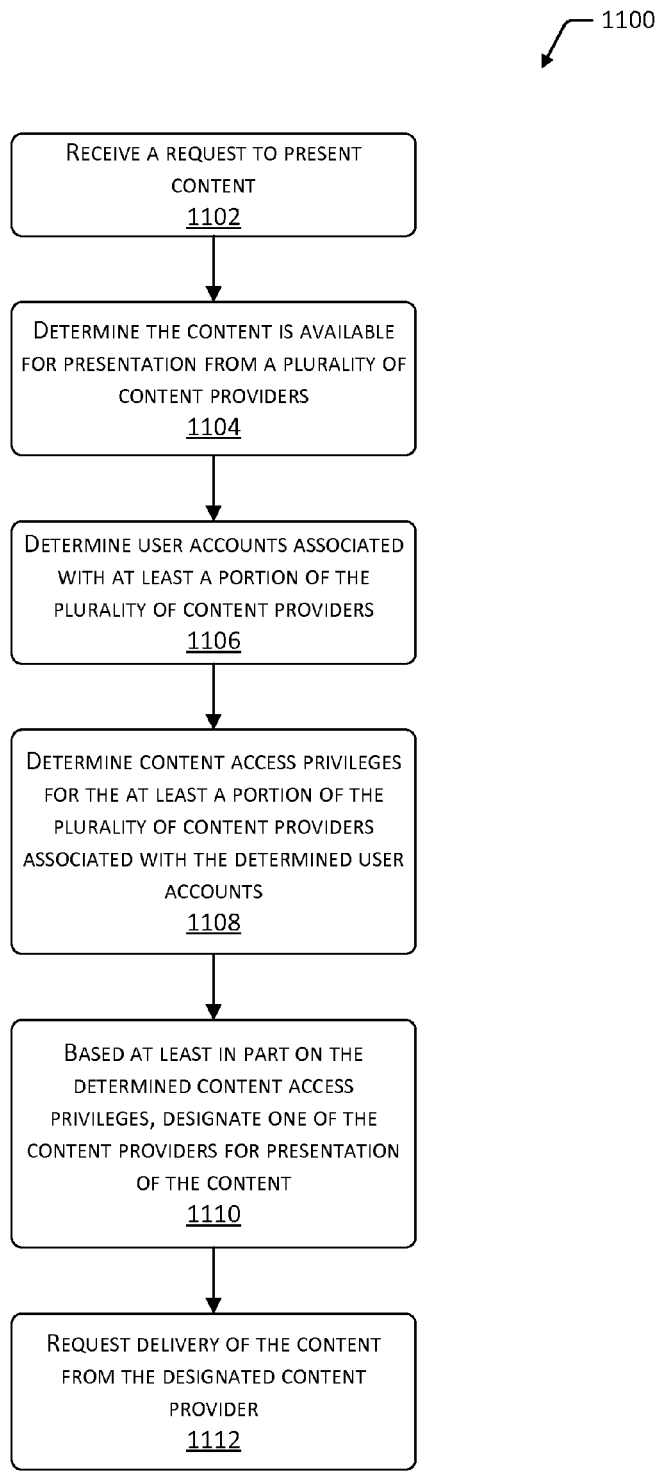
FIG. 11 is a flow diagram of yet another process of automatically selecting a content provider to provide content.

FIG. 11 is a flow diagram 1100 of yet another process of automatically selecting a content provider 124 to provide content 126. This process may be implemented by one or more of the media device 104, the weighting provider 128, or the content provider 124.

Block 1102 receives data indicative of a request to deliver content 126. For example, the weighting provider 128 may receive a request from the media device 104.

Block 1104 determines the content 126 is available from a plurality of content providers 124. As described above, the weighting provider 128 may send inquiries to the plurality of content providers 124 to determine which have the same or similar content 126 available.

Block 1106 determines user accounts associated with access to at least a portion of the plurality of the content providers 124. In one implementation, the content provider account management module 136 may make this determination using information provided by the user 102, the content providers 124, or both the user 102 and the content providers 124.

Block 1108 determines content access privileges for the at least a portion of the plurality of content providers 124 associated with the determined user accounts. In one implementation, the content access privileges are indicative of the content 126 availability as part of an existing subscription or for an additional fee from the content provider 124.

Based at least in part on the determined content access privileges, block 1110 designates one of the content providers 124 for delivery of the content 126. In some implementations, additional information may be considered in the designation.

In one implementation, the designation of the one of the content providers 124 is further based at least in part on the user data 302 associated with a particular one of the user accounts at the plurality of content providers 124. For example, the user data 302 may include one or more of user preferences 302(1), content delivery cost 302(2), content consumed 302(3), queue management 302(4) activity, and so forth.

In another implementation, the designation of the one of the content providers 124 is further based at least in part on the content data 304 indicative of consumption of the content 126 by the same or other user accounts at the plurality of content providers 124.

In yet another implementation, the designation of the one of the content providers 124 is further based at least in part on the technical data 306 indicative of provisioning of the content 126 by the one or more content providers 124.

In still another implementation, the designation of the one of the content providers 124 is further based at least in part on the business data 308 indicative of operational or contractual relationships involved in distribution of the content 126. As described above, the operational or contractual relationships involved in distribution of the content 126 may designate a preference for a particular content provider 124.

Block 1112 requests delivery of the content 126 from the designated content provider 124 using the associated user account. As described above, the weighting provider 128 may send information to the content provider 124 initiating transfer of the content 126 to the media device 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer-readable storage medium as instructions executable on one or more processors.

The computer-readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-implemented method for utilizing a computerized system, the computer-implemented method comprising:
receiving a request for video content available from a plurality of content providers;
accessing selection data associated with the video content and the plurality of the content providers, wherein the selection data is indicative of one or more aspects of delivery of the video content indicated by the request from one or more of the plurality of content providers;
accessing a weighting profile associated with retrieval of the video content, the weighting profile comprising one or more weighting values, wherein each of the weighting values is associated with one of the aspects of the selection data;
generating a total weight indicative of retrieval of the video content from each of the plurality of content providers, the total weight determined based, at least in part, by evaluating the selection data associated using the one or more of the plurality of content providers using the weighting values associated with the selection data; and
based at least in part on the total weights of the plurality of content providers, designating a content provider for delivery of the requested video content.

2. The method of claim 1, further comprising requesting delivery of the video content from the designated content provider.

3. The method of claim 1, further comprising initiating transfer of at least a portion of the video content from the designated content provider to an edge node of a content delivery network.

4. The method of claim 1, the one or more aspects of delivery of the video content from one or more of the plurality of content providers comprising one or more of:
a delivery cost of the video content from each of the plurality of content providers,
a count of total number of accesses of the video content for a given period of time for each of the plurality of the content providers,
historical delivery bitrate of the video content from each of the plurality of content providers, or
resolution of the video content as provided from each of the plurality of content providers.

5. A computer-readable storage medium storing instructions, which when executed by a processor, cause the processor to perform actions comprising:
receiving information indicative of a request for delivery of content available to a media device from a plurality of content providers;
generating a total weight associated with delivery of the content from one or more of the plurality of content providers to the media device, wherein the total weight is based at least in part on data indicative of one or more aspects of delivery of the content from the one or more of the plurality of content providers to the media device and a weighting profile comprising one or more weighting values;

selecting, based at least in part on the total weights, one of the plurality of content providers for delivery of the content to the media device; and providing the selection of the one content provider.

6. The computer-readable storage medium of claim 5, wherein the content comprises one or more of audio, video, electronic books, or an executable application.

7. The computer-readable storage medium of claim 5, further comprising:
calculating a first portion of the total weight before receiving the information indicative of the request;
calculating a second portion of the total weight using data indicative of one or more aspects specific to the particular content indicated in the request; and
wherein the generating the total weight further comprises combining the first portion of the total weight and the second portion of the total weight.

8. The computer-readable storage medium of claim 5, wherein the data indicative of one or more aspects of delivery of the content from one or more of the plurality of content providers comprises user account information for one or more of the content providers.

9. The computer-readable storage medium of claim 5, further comprising:
determining availability of the content for delivery from a plurality of content providers, wherein the determining availability of the content for delivery from the plurality of content providers comprising sending a request for content availability information to the plurality of content providers.

10. The computer-readable storage medium of claim 5, further comprising:
determining user data associated with the request, wherein the user data comprises one or more of:
user preferences,
content delivery cost,
content previously consumed, or
queue management activity; and
wherein the selecting of one of the plurality of content providers is further based at least in part on the user data.

11. The computer-readable storage medium of claim 5, further comprising generating the weighting profile, the generating comprising:
acquiring the data indicative of one or more aspects of delivery of the content from one or more of the plurality of content providers to the media device;
determining weights associated with one or more aspects; and
generating the weighting profile associating the one or more aspects with a determined weight.

12. The computer-readable storage medium of claim 11, the determining weights comprising:
presenting one or more options to one or more users, wherein the options are associated with content delivery; and
receiving input from one or more users responsive to the one or more options.

13. A system, comprising:
a processor; and
a memory device coupled to the processor, the memory device storing instructions, which when executed by the processor, cause the processor to:
receive data indicative of a request to deliver content to a media device;
determine that the content is available from a plurality of content providers;
determine user accounts associated with access to at least a portion of the plurality of the content providers;
determine content access privileges for the at least a portion of the plurality of content providers associated with the determined user accounts;
access selection data indicative of one or more aspects of delivery of the content from the plurality of the content providers;
access a weighting profile comprising one or more weighting values associated with at least a portion of the selection data;
generate a total weight indicative of delivery of the content for one or more of the plurality of content providers, wherein the total weight is based at least in part on the selection data and the weighting profile; and
based at least in part on the determined content access privileges and the total weight, designate one of the content providers for delivery of the content to the media device.

14. The system of claim 13, wherein the instructions further cause the processor to: request delivery of the content from the designated content provider using the associated user account.

15. The system of claim 13, wherein the content access privileges are indicative of the content availability as part of an existing subscription or for an additional fee.

16. The system of claim 13, wherein the designation of the one of the content providers is further based at least in part on user data associated with a particular one of the user accounts at the plurality of content providers, the user data comprising one or more of:
user preferences,
content delivery cost,
content previously consumed, or
queue management activity.

17. The system of claim 13, wherein the designation of the one of the content providers is further based at least in part on content data indicative of consumption of the content by other user accounts at the plurality of content providers.

18. The system of claim 13, wherein the designation of the one of the content providers is further based at least in part on technical data indicative of provisioning of the content by the one or more content providers.

19. The system of claim 13, wherein the designation of the one of the content providers is further based at least in part on business data indicative of operational or contractual relationships involved in distribution of the content.

20. The system of claim 19, wherein the operational or contractual relationships involved in distribution of the content designate a preference for a particular content provider.

* * * * *